(12) United States Patent
Dennis et al.

(10) Patent No.: US 6,368,094 B1
(45) Date of Patent: Apr. 9, 2002

(54) MULTI-PATH COMPRESSION MOLDING APPARATUS

(75) Inventors: Michael D. Dennis, Longview, IL (US); Karl Zemlin, Indianapolis; Michael E. Albertson, Brownsburg, both of IN (US); Larry M. Zepf; Gayle L. Johnson, both of Crawfordsville, IN (US); Harshad Borgaonkar, Santa Clara, CA (US)

(73) Assignee: Alcoa Closure Systems International, Crawfordsville, IN (US)

( * ) Notice: Subject to any disclaimer, the term of this patent is extended or adjusted under 35 U.S.C. 154(b) by 0 days.

(21) Appl. No.: 09/444,814

(22) Filed: Nov. 22, 1999

(51) Int. Cl.[7] .................... B29C 31/06; B29C 43/08
(52) U.S. Cl. ................ 425/144; 425/170; 425/297; 425/311; 425/313; 425/261; 425/348 R; 425/382.3; 425/809
(58) Field of Search ................ 425/809, 311, 425/313, 297, 257, 261, 348 R, 382.3, 144, 170

(56) References Cited

U.S. PATENT DOCUMENTS

| | | | |
|---|---|---|---|
| 3,360,827 A | * | 1/1968 | Aichele |
| 3,820,578 A | * | 6/1974 | Staba .................... 425/259 |
| 4,497,765 A | | 2/1985 | Wilde et al. |
| 4,640,673 A | | 2/1987 | Takeda et al. |
| 4,776,782 A | | 10/1988 | Murayama et al. |
| 5,147,663 A | * | 9/1992 | Trakas .................... 425/549 |
| 5,554,327 A | | 9/1996 | Ingram et al. |
| 5,603,964 A | * | 2/1997 | Rote et al. .............. 425/809 |
| 5,645,867 A | * | 7/1997 | Crank et al. ............ 425/144 |
| 5,786,079 A | | 7/1998 | Alieri |
| 5,807,592 A | | 9/1998 | Alieri |
| 5,866,177 A | | 2/1999 | Ingram |

* cited by examiner

Primary Examiner—Robert Davis
(74) Attorney, Agent, or Firm—Rockey, Milnamow & Katz Ltd.

(57) ABSTRACT

An apparatus delivers plural molten plastic pellets into cavities for compression molding of the pellets into bottle closures or bottle closure liners. The apparatus is provided for delivering molten plastic pellets from a supply of molten plastic to a plurality of molding blocks, each molding block having a row of cavities. The molding blocks are carried on a rotating carousel. The apparatus includes a rotating multi-cutter with a plurality of cutter blades, and a manifold block which receives the extruded molten-plastic and delivers the molten plastic to a plurality of nozzles, each nozzle aligned with one or more of the cutter blades. The cutter blades remove a row of plastic pellets from the molten plastic at the nozzles and deliver the plastic pellets into one row of cavities of a molding block.

20 Claims, 8 Drawing Sheets

FIG. 10
FIG. 11
FIG. 12
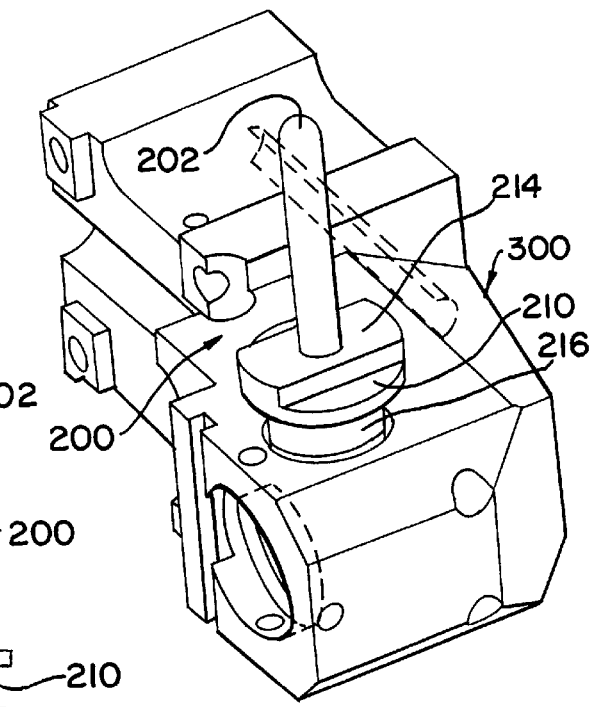
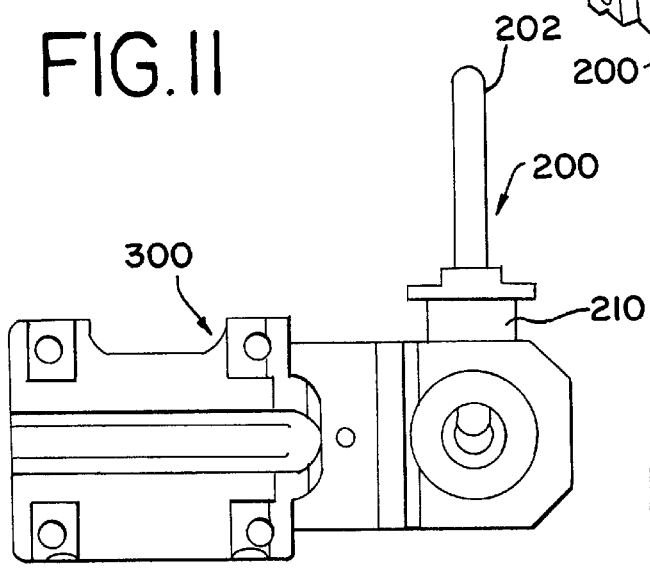
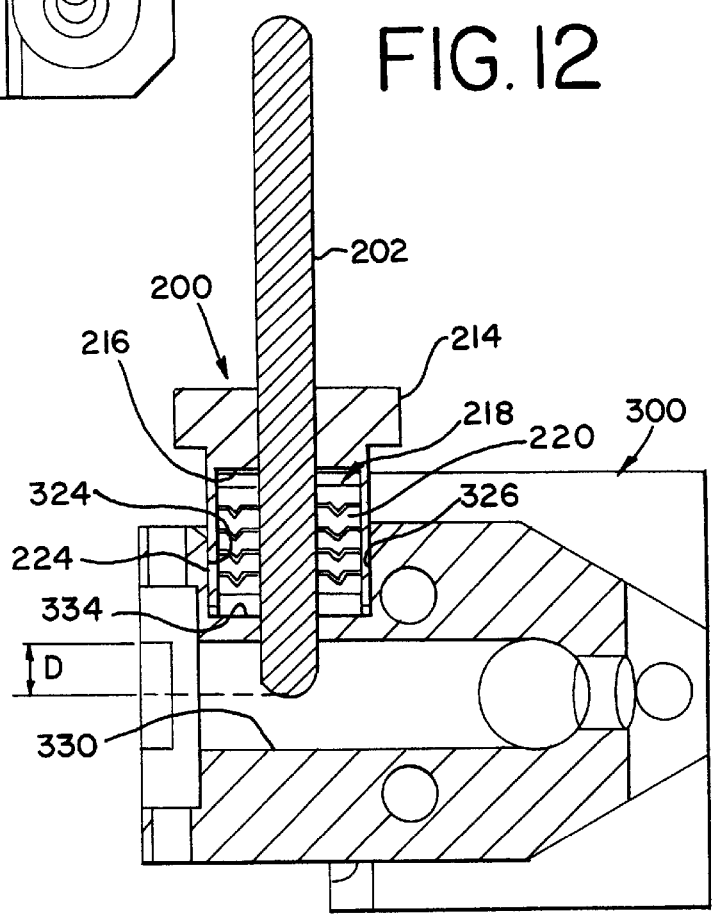

MULTI-PATH COMPRESSION MOLDING APPARATUS

TECHNICAL FIELD OF THE INVENTION

The present invention relates to a method and apparatus for cutting discrete quantities of molten plastic material from a supply of molten plastic material for subsequent compression molding of the plastic material into plastic articles. More particularly, the invention relates to a plurality of cutters which rotate relative to a plurality of molten plastic delivery nozzles to cut pellets of molten plastic from the nozzles and to carry the thus cut pellets of molten plastic into cavities for compression molding articles.

BACKGROUND OF THE INVENTION

U.S. Pat. No. 4,277,431, to Peller, hereby incorporated by reference, discloses an apparatus for cutting discrete quantities or pellets of molten plastic material for subsequent placement in respective mold cavities. This apparatus is particularly suited for use in the manufacture of closures by compression molding, including the formation of compression molded closure shells, and the formation of compression molded liners within associated closure shells. U.S. Pat. Nos. 4,343,754 to Wilde et al., and 4,497,765 to Wilde et al., both hereby incorporated by reference, disclose compression molding of threaded, tamper-indicating plastic closures, and compression molding of liners in such closures, for which manufacturing processes the apparatus of the above U.S. Pat. No. 4,277,431 is suited for use.

The apparatus of U.S. Pat. No. 4,277,431 includes a nozzle through which molten plastic material is delivered from an associated extruder or the like, and a rotatably driven cutting blade which is rotated with respect to the nozzle. As plastic is extruded from the nozzle, a discrete quantity or pellet of plastic material is cut during each rotation of the associated cutting blade. Immediately thereafter, the severed plastic pellet is moved from the face of the nozzle by the cutting blade for delivery to a respective mold cavity. The mold cavity may comprise either a female mold die for formation of a closure shell by compression molding, or a closure shell within which the molten plastic is compression molded for formation of a sealing liner.

The cutter apparatus of U.S. Pat. No. 4,227,431 is configured to facilitate separation of each plastic pellet from the cutting blade by creating a slight mechanical interference between the cutting blade and the face of the associated nozzle. Thus, as the cutting blade rotates with respect to the nozzle, the blade is flexed or deflected as it engages the nozzle face and severs the extruded plastic material. As the blade continues to rotate, with the severed plastic material carried on the flexed surface of the cutting blade, the cutting blade disengages the face of the nozzle, thereby rapidly accelerating the pellet to facilitate its separation from the blade and delivery of the pellet to one of the associated cavities. This cutting and subsequent "flicking" like action of the cutting blade is sometimes referred to as the "cut-and-flip" portion of each cutting cycle.

The above patent contemplates that the disclosed cutting apparatus be mechanically-driven from the associated molding apparatus, thus effecting the desired synchronous operation of the cutter. However, it will be appreciated that increases or decreases in production speed necessarily result in corresponding variation in the "cut-and-flip" portion of the cutting cycle, which can create undesirable variability in the speed, direction, rotational velocity, and orientation of the plastic pellet as it is delivered to the associated cavity. This can, in turn, create problems regarding pellet placement, orientation, and an undesirable tendency of the pellet to bounce upon delivery into the associated cavity.

U.S. Pat. No. 5,596,251 describes a cutter apparatus driven by a servo motor, the operation of which is coordinated with an associated rotary carousel on which cavities are successively presented to the cutter apparatus. In order to effect separation of each discrete quantity of plastic material from the cutting blade of the cutter apparatus, the servo motor is operated to create a period of distinct deceleration during each rotary cutting cycle, thereby separating the molten plastic from the surface of the cutting blade.

The cutter apparatus disclosed in each of the aforementioned patents includes a single rotating cutter which cuts and disperses a single pellet during each rotation. The throughput of such apparatus is thus limited by the rotational speed of the single cutter. To increase the overall throughput of the compression molding apparatus requires additional cutter apparatuses and associated carousels which requires costly additional factory floor space.

The present inventors have recognized that it would be desirable to provide a cutter apparatus for cutting molten plastic pellets from a source of molten plastic material and delivering the pellets into successive cavities for subsequent compression molding which could be effectively operated at a high rate of speed to produce a high rate of molded articles. The apparatus desirably would reliably operate to produce a high percentage of flawlessly molded articles. The apparatus desirably would require a minimum of factory floor space.

SUMMARY OF THE INVENTION

The present invention is directed to a plastic pellet cutting and delivery system particularly suited for use in compression molding of plastic closure shells, and plastic liners in closure shells. The present invention includes a high throughput compression molding apparatus having a rotatable bank of cutters operatively associated with a bank of molten plastic delivery nozzles. Also, the invention includes a plurality of molding blocks, each block having a row of molding cavities for successively receiving a row of plastic pellets cut by the bank of cutters from the bank of molten plastic delivery nozzles. The molding blocks are advantageously carried on a revolving carousel.

A compression molding device such as disclosed in U.S. Pat. Nos. 4,343,754 or 4,497,765 can be used to mold the plastic pellets carried by the blocks into articles, such as threaded, tamper-indicating plastic closures or liners for closures.

The present system is used in conjunction with a rotary compression molding apparatus, which typically includes a rotating carousel or turret which carries cavities in the form of mold dies or closure shells. According to the present invention, the carousel circulates molding blocks having radially arranged rows of cavities. The present system effects delivery of plural discrete quantities of molten plastic material (i.e., plastic pellets) to the rows of circulating cavities by the provision of an extruder or like apparatus which provides a source of molten plastic material, and a plurality of the cutting blades driven with respect to nozzles flow connected to the extruder. Upon rotation of the blades, the blades cut the plurality of pellets of plastic material as it is being extruded from the nozzles. A precision servo motor drives the cutter shaft via a toothed timing belt and pulley arrangement.

The present invention incorporates a multi-cutter comprising a plurality of cutter assemblies mounted on a cutter shaft, the cutter shaft being rotated about its axis by a servo motor. The cutter assembly can be as described in U.S. application Ser. No. 09/444,936, filed on the same day as the present application, and identified by attorney docket number HCI0467P00480US, and entitled: "Rotary Cutter For Cutting, Measuring, and Dispensing Molten Plastic," herein incorporated by reference.

Each such cutter assembly comprises a cutter body which is held substantially within a radial bore formed in an end portion of a cutter shaft, and a protruding cutter head extending from the cutter body. The cutter shaft includes one or more internal air passages for pressurized air delivery to each of the cutter bodies. Each cutter assembly can include a plunger which reciprocates adjacent to the cutter head to displace a plastic pellet held by the cutter head. Each cutter body can include a series of air apertures directed toward an internal region of the respective cutter head for passing pressurized air into the cutter head to dislodge a plastic pellet held thereby. The air apertures are in flow communication with one of the internal air passages within the cutter shaft. Internal cooling fluid channels through the cutter shaft are in flow communication with an annular area between each cutter body and an inside wall of the respective radial bore of the cutter shaft for maintaining the cutter bodies at a desired temperature during operation.

The cutter shaft is rotated within a rotary union block. The cutter shaft includes one or more first annular channels around its circumference in flow communication with the internal air passages. The cutter shaft also includes second and third annular channels around its circumference and in flow communication with the two internal cooling channels respectively. The rotary union block includes corresponding channels or passages in flow communication with the first, second and third annular channels of the cutter shaft, such that pressurized air and cooling water can be sealingly transferred between the rotary union block and the cutter shaft given that the cutter shaft is rotating and the union block is stationary.

The bank of extrusion nozzles receive flow of molten plastic from a manifold assembly. The manifold assembly includes an inlet adapter, open into a first cross shaped or "clover leaf" shaped block manifold which separates the flow into four divergent flow paths. The four flow paths each connect to one of four volumetric metering or proportioning pumps. The volumetric metering pumps are used to provide consistent volume flow and pressure of the molten plastic. The pumps are each connected at outlets thereof to a second cross shaped or "clover leaf" shaped block manifold. The second manifold includes channels that direct the four flow paths into four adjacent outlets. The four outlets are connected by tubes, such as hot runners, to a right angle or L-shaped manifold block. The right angle manifold block is connected to a bank of nozzles. The first and second manifolds, the tubes, and the right angle manifold block are all heated and insulated to maintain the molten plastic at a precise and controllable temperature.

The manifold assembly thus cooperates with the bank of delivery nozzles to deliver a controlled flow of molten plastic to the nozzles. The bank of rotary cutters are arranged to cooperate with the bank of delivery nozzles to separate rows of pellets of molten plastic extruded from the nozzles and to dispense the rows of pellets into successively presented molding blocks each having a row of cavities, for subsequent compression molding into articles. According to the invention, a greatly increased throughput of plastic pellets deposited into molding cavities for compression molding is achieved without substantially increasing a floor space requirement for the compression molding apparatus.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 10 is a perspective view of a temperature probe which can be incorporated into the apparatus of the present invention;

FIG. 11 is an elevational view of the apparatus of FIG. 10; and

FIG. 12 is a sectional view taken generally along line 12—12 of FIG. 11.

DETAILED DESCRIPTION OF THE PREFERRED EMBODIMENTS

Figure 1:
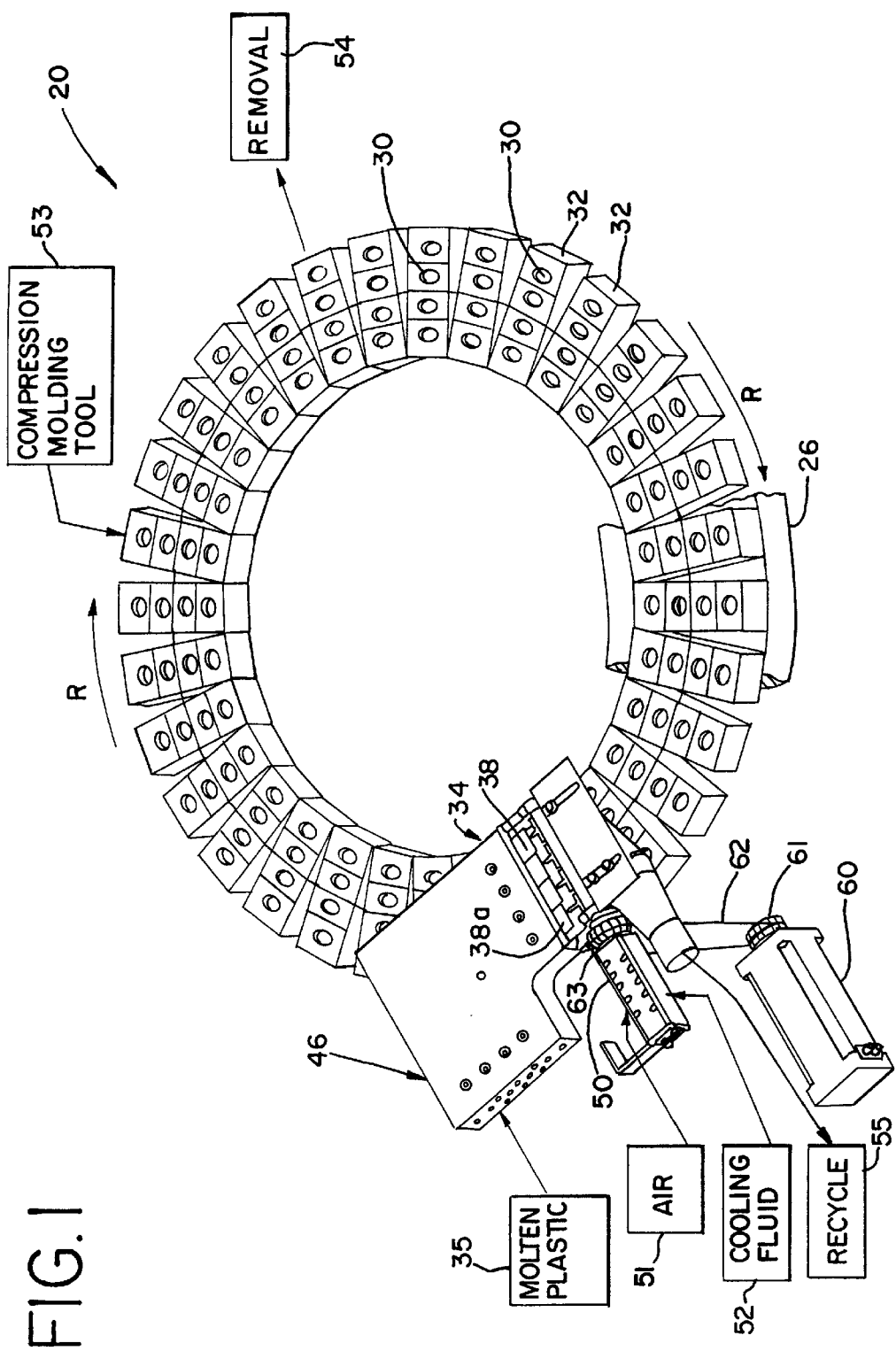
FIG. 1 is a partially fragmentary, partially schematic, perspective view of a molding system of the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a compression molding apparatus 20 for formation of closure shells, liners, or other articles by compression molding. The apparatus 20 includes an annular carousel 26 (shown in fragmentary fashion) which supports a plurality of molding blocks 32 arranged in a circle,. The carousel 26 rotates in the direction R about a vertical centerline of the carousel. Each block 32 includes a plurality of cavities 30 arranged in a row and aligned radially of the centerline of the carousel 26. In the illustrated embodiment each block 32 includes four cavities 30.

The apparatus 20 also includes a molten plastic delivery assembly 34. The delivery assembly 34 includes a manifold assembly 35 (shown schematically as a box in FIG. 1) that is shown and described in detail below with respect to FIGS. 7 through 9. The assembly 34 includes an L-shaped manifold block 46 and a plurality of nozzles 38a–38d for dispensing molten plastic material. The manifold block 46 is heated to retain the molten plastic in its molten state.

The apparatus 20 includes a multi-cutter 40 that has a plurality of cutter assemblies 40a–40d (shown in FIG. 3) that remove plastic material from the nozzles 38a–38d to be deposited into the cavities 30 of each successively presented block 32.

The cutter assemblies 40a–40d are mounted on a shaft 41 which is conjointly rotated via a driven pulley 63 connected thereto, which is driven by a belt 62. The belt is also wrapped around a drive pulley 61 which is driven by a stepper motor or a precision servo motor 60. The belt 62 is shown as a line but in practice would preferably be a flat, elastomeric fan belt or a timing chain. The shaft 41 is journaled in a rotary union 50 that supplies air 51 and cooling fluid 52 to the cutters 40 as described below.

The carousel is driven in a synchronized step fashion such that the rotating multi-cutter 40 separates pellets of molten plastic from the nozzles 38a–38d and deposit the pellets into the four cavities 30 of each successive block 32. The pellets are compression molded at a molding station 53. The method and apparatus for compression molding can be as described in U.S. Pat. Nos. 4,343,754 or 4,497,765, herein incorporated by reference. At a removal station 54 the molded and cooled articles can be removed from each block 32, successively.

The molten plastic delivery system 34 can advantageously be controllable to maintain a steady and precise, selected temperature using heating elements associated with the manifold block 46 and the manifold assembly 35. The system can be insulated to assist in controlling the temperature of the molten plastic.

Figure 2:
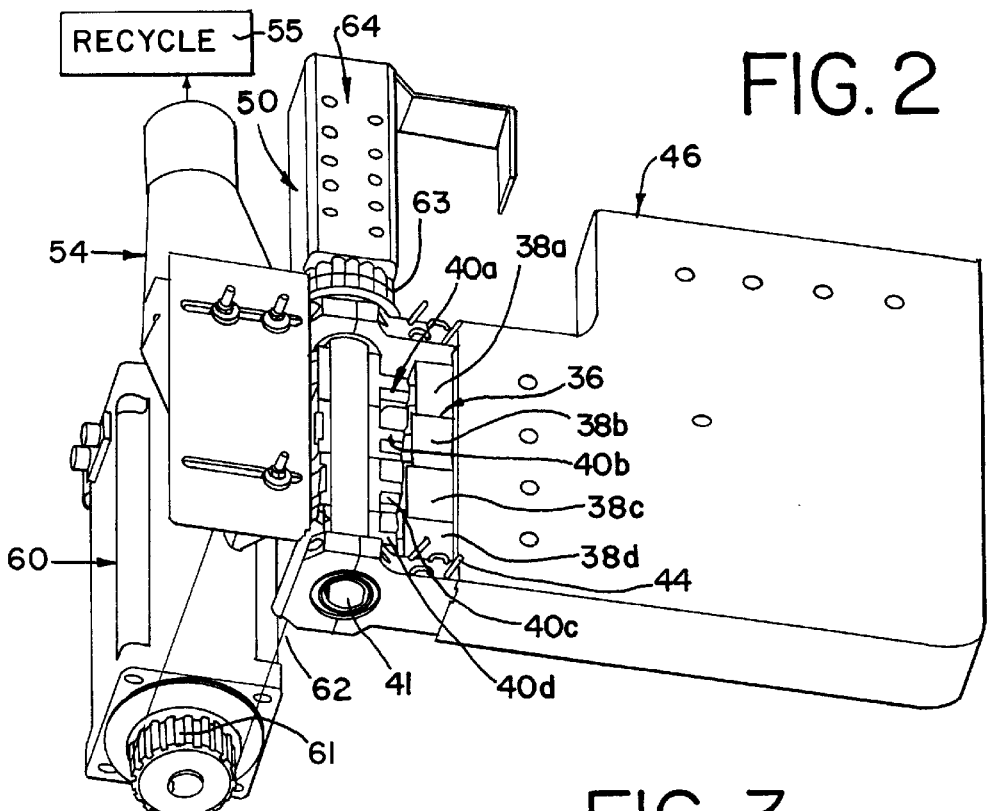
FIG. 2 is an enlarged perspective view of a portion of the system shown in FIG. 1.

FIG. 2 shows the rotary union block 50 arranged on an opposite side of the driven pulley 63 as the multi-cutter 40. The shaft extends into the rotary union block 50. The rotary union block 50 includes tube connections 64 for flow-connecting the union block 50 to a cooling fluid source conduit and cooling fluid return conduit, and to a source of pressurized air and a vent as needed. The multi-cutter 40 includes the four cutter assemblies 40a, 40b, 40c, 40d which respectively align with the four nozzles 38a, 38b, 38c, 38d as the multi-cutter 40 is rotated about its longitudinal axis by the driven pulley 63.

FIG. 2 illustrates that the rotating shaft 41 mounts the cutter assemblies 40a, 40b, 40c, 40d which extend radially therefrom. The shaft 41 includes axially arranged flow channels which deliver pressurized air to each cutter assembly. The pressurized air is used to assist in expelling the plastic pellet removed and carried away from the nozzles 38a, 38b, 38c, 38d, respectively. The air channels and cutters are arranged as disclosed in copending application Ser. No. 09/444,936, filed Nov. 22, 1999, attorney docket number HCI0467P0480US, filed on the same day as the present application and herein incorporated by reference. The four cutter assemblies 40a, 40b, 40c, 40d can be arranged on a common air channel to expel four plastic pellets simultaneously or can be on individual air channels such that the timing of pellet ejection of each cutter can be precisely adjusted. In this regard, an intelligent logic controller (PLC) can be used to time the air assisted ejection of the pellets from the cutter assemblies. A sequential ejection of the pellets from the four cutter assemblies 40a–40d (and from the additional cutters 42a–42d, described below) is contemplated due to the fact that the radially outermost cavities of the successively presented molding blocks on the revolving carousel are moving at a greater velocity than the radially innermost cavities. Cooling fluid channels are provided which extend along the shaft axially to cool the rotating multi-cutter 40 as described in the aforementioned copending application.

Figure 3:
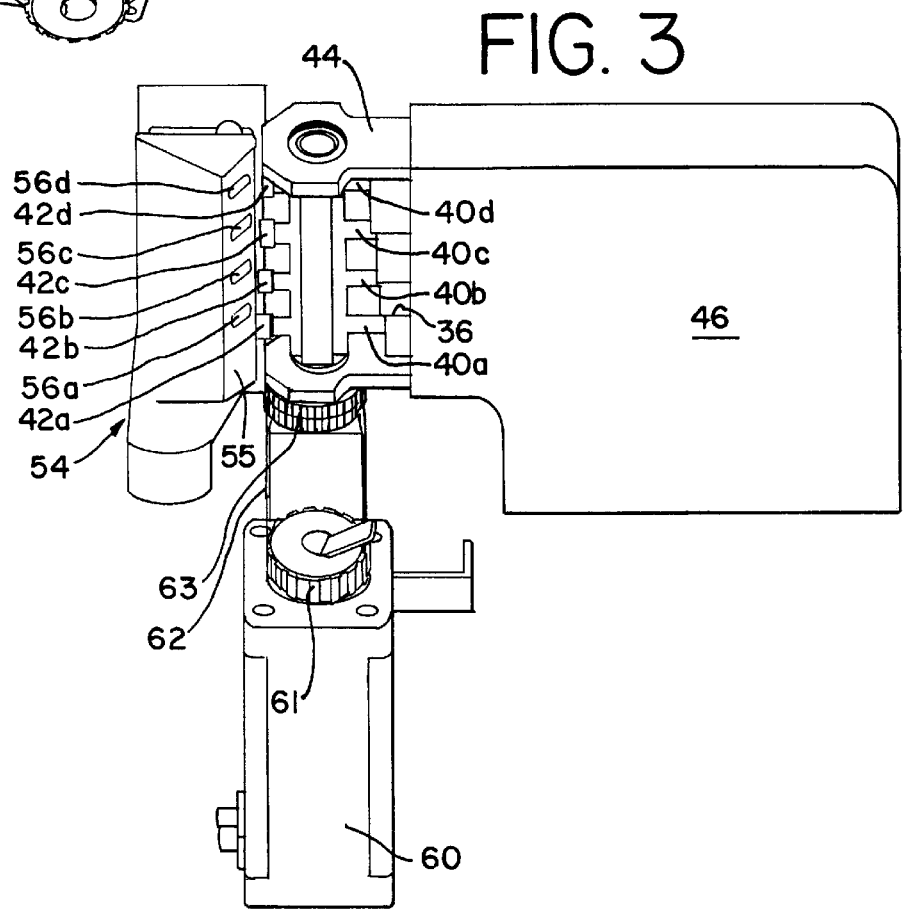
FIG. 3 is a bottom perspective view of the apparatus shown in FIG. 2.
Figure 5:
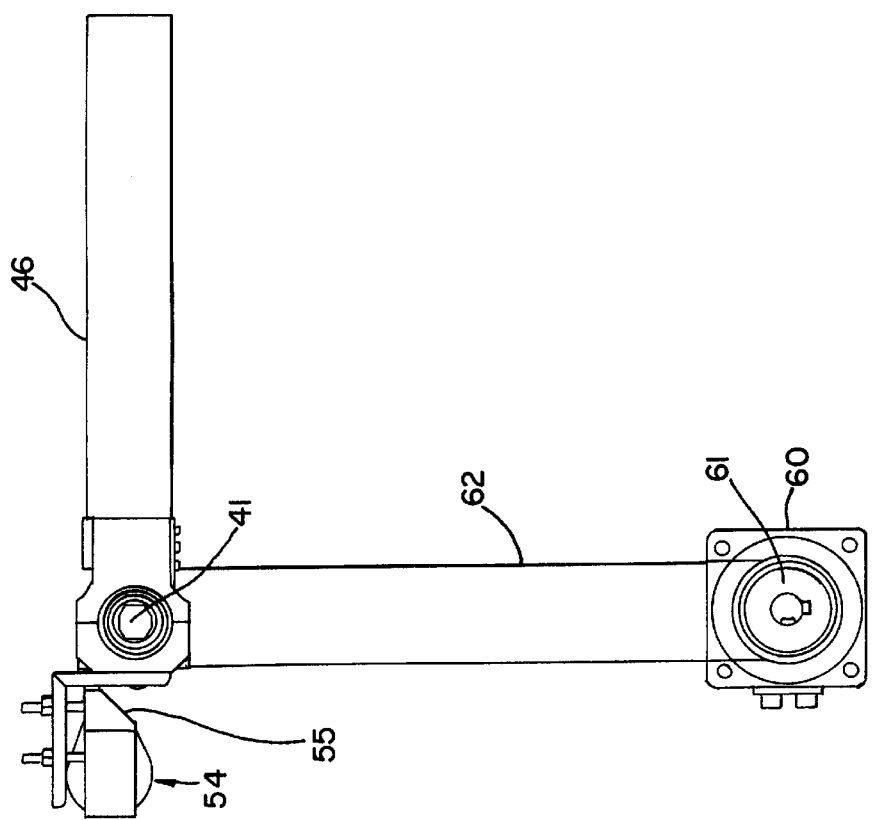
FIG. 5 is a front view of the apparatus shown in FIG. 4.

As shown in FIG. 3 a second set of cutter assemblies 42a, 42b, 42c, 42d can be arranged at 180° diametrically opposite the cutter assemblies 40a–40d. Thus, for any selected rotary speed of the multi-cutter 40, and a corresponding adjustment in the carousel rotary speed, twice the throughput can be achieved.

As illustrated in FIG. 3, the apparatus 20 also includes a waste/purge removal duct 54. When selected by an operator, this duct provides an alternate location for dispensing molded plastic pellets rather than into the cavities 30. This is particularly useful during start up operations. By adjusting the timing of the multi-cutter, the plastic pellets can be deposited into the waste/purge duct 54 until the quality or timing of the formed pellets is acceptable to begin depositing pellets into the cavities 30 of the blocks 32. The duct includes an angled facing wall 55 with spaced apart cavity-simulating apertures 56a–56d. Pellets are ejected from the cutter assemblies 40a–40d and 42a–42d and into the apertures 56a–56d during practice, start-up or testing. The pellets traveling through the duct 54 are collected into a storage container 55 for recycling or disposal.

Figure 4:
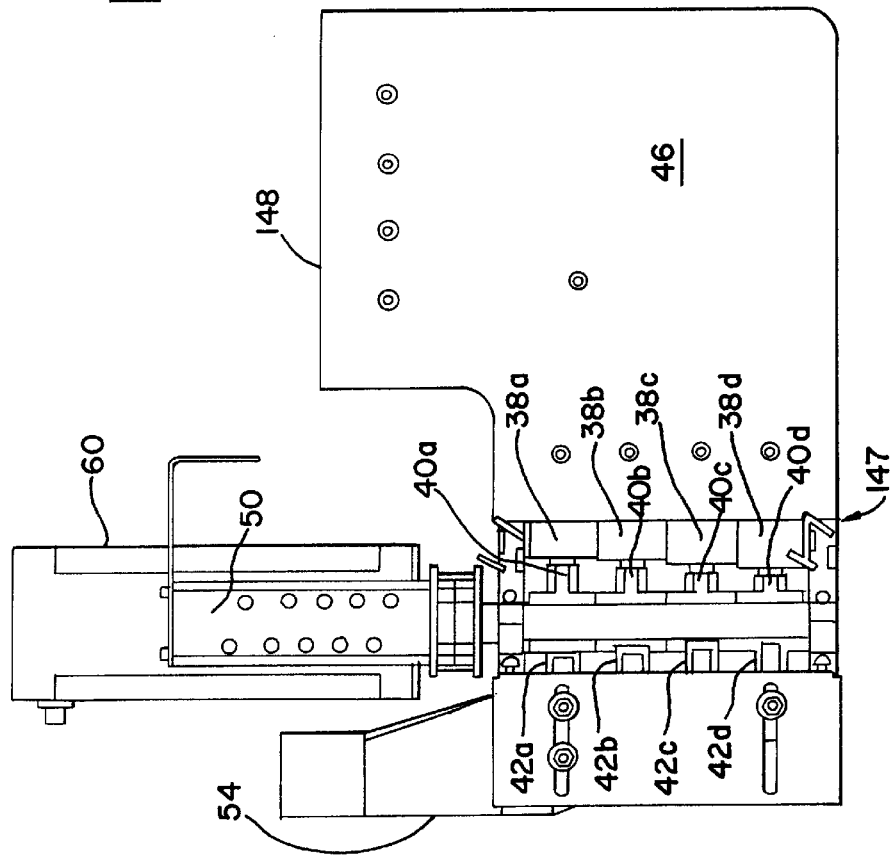
FIG. 4 is a plan view of the apparatus shown in FIG. 3.

FIG. 4 illustrates the manifold block having a nozzle end 147 and an inlet end 148. The molten plastic nozzles 38a, 38b, 38c, 38d are arranged at the nozzle end 147. As shown in FIGS. 1 and 4, the nozzles are progressively extended from the manifold block 46, with the outside nozzle 38a, seen in a radial direction from a center line of the carousel 26, being the most recessed. The inside nozzle 38d is the most extended from the manifold block 46.

Figure 6A:
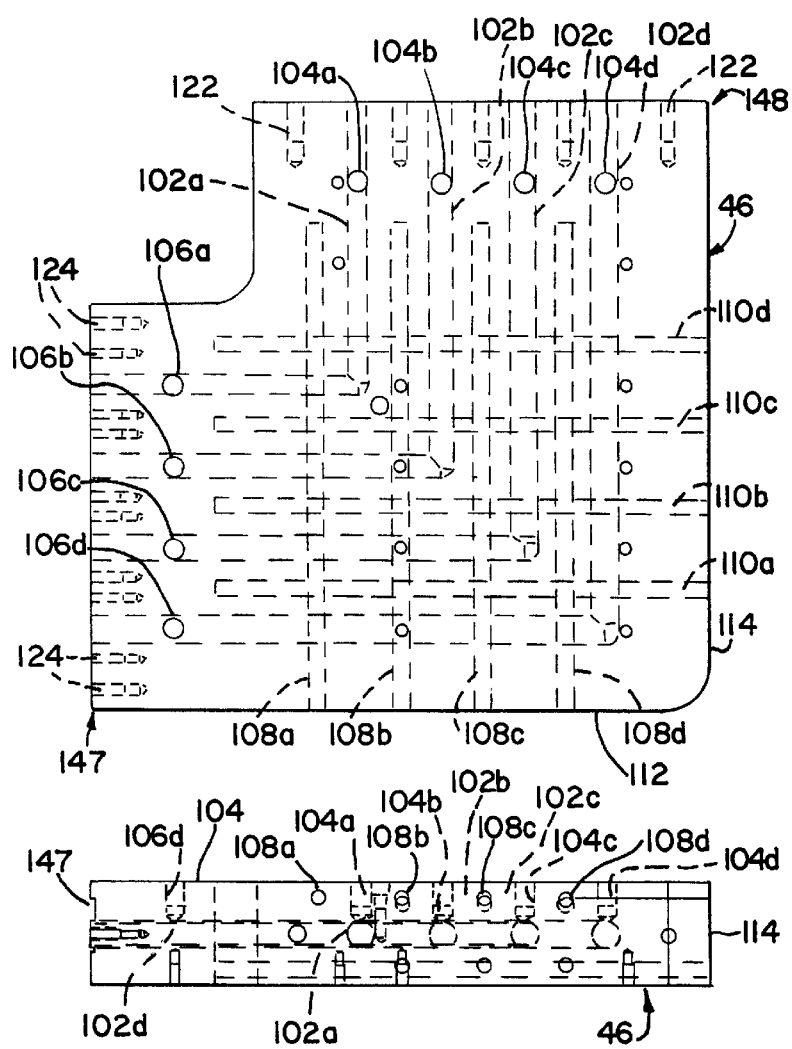
FIG. 6A is a plan view of a manifold block shown.
Figure 6B:
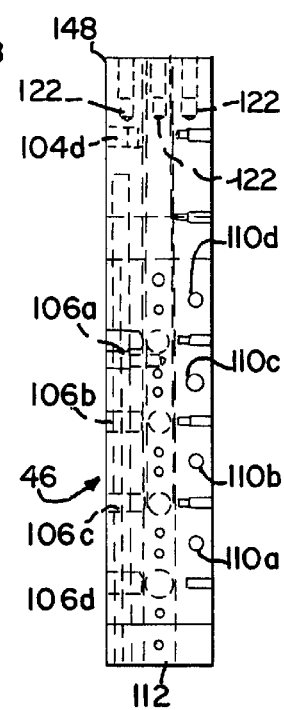
FIG. 6B is a right side view of the manifold block of FIG. 6A.
Figure 6C:
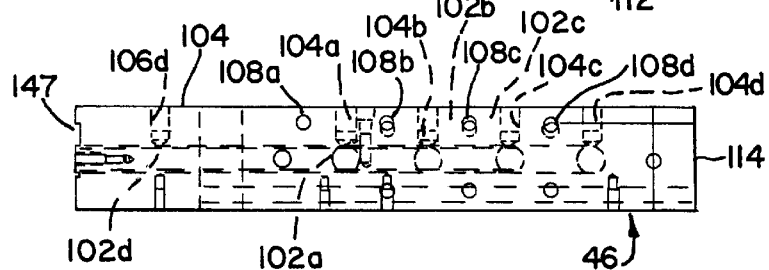
FIG. 6C is a front side view of the manifold block of FIG. 6A.

FIGS. 6A through 6C disclose the L-shaped manifold block 46 in more detail. The manifold block 46 includes L-shaped molten plastic channels 102a, 102b, 102c, 102d which extend from the inlet end 148 to the outlet end 147. Extending through a top wall 104 of the manifold block 46 are inlet temperature ports 104a, 104b, 104c, 104d, and outlet temperature ports 106a, 106b, 106c, 106d. Temperature probes can be inserted into the ports 104a–104d and 106a–106d.

Two series of parallel heater bores are arranged into the manifold block 46. These heater bores receive heating elements, such as electric heating elements, which maintain the manifold block, and thus the molten plastic therein, at the desired temperature before exiting the nozzles 38a–38d. A first set of bores 108a, 108b, 108c, 108d extend from a lateral side 112 of the manifold block 46 toward the inlet end 148. A second set of bores 110a, 110b, 110c, 110d extend from an adjacent side 114 toward the outlet end 147. The bores 108a–108d and 110a–110d crisscross, but occupy two different levels within the manifold block 46.

A plurality of threaded bores 122 are formed into the inlet end 148 for receiving fasteners to connect the manifold assembly 35 as described below. A further plurality of threaded bores 124 are provided on the outlet end 147 to attach the nozzles 38a–38d. Two fasteners, and two threaded bores 124, are used for attachment of each nozzle to the manifold block 46.

Figure 7:
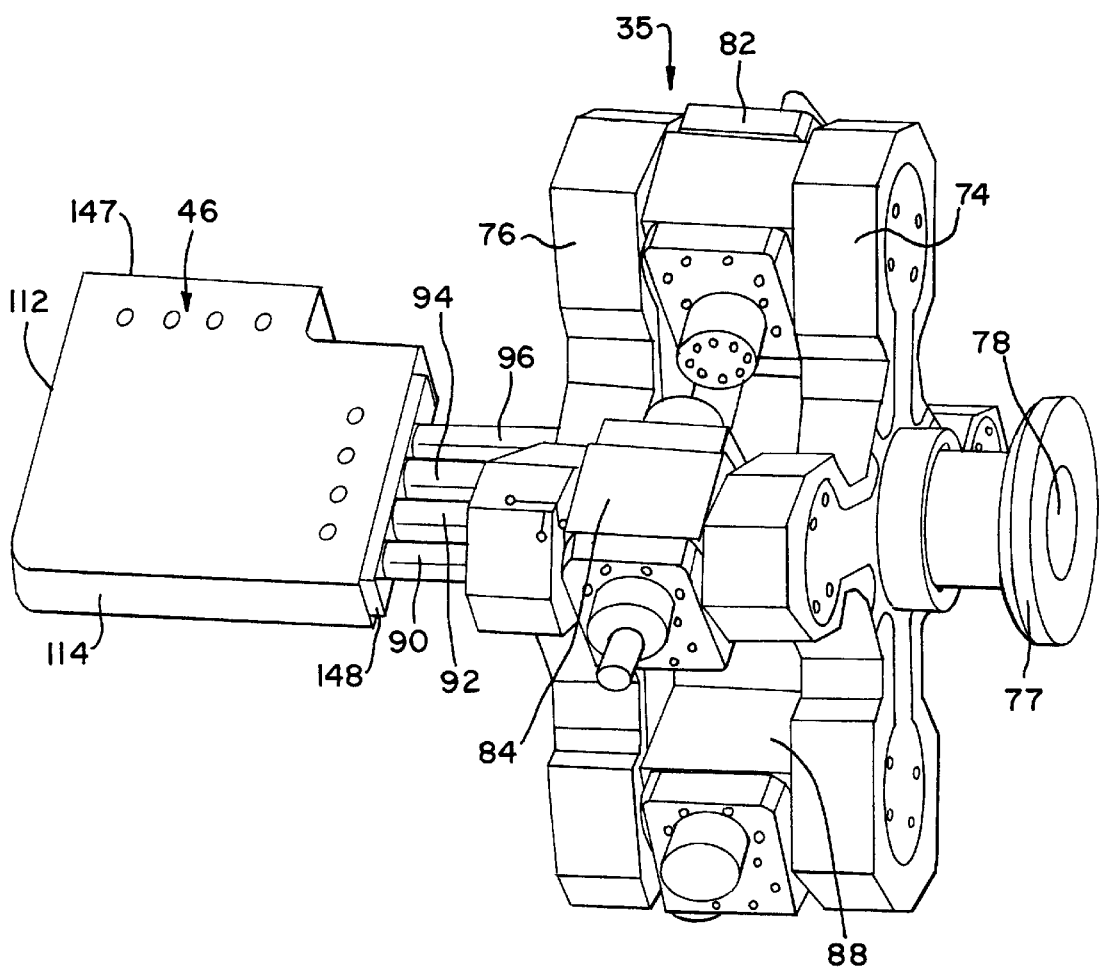
FIG. 7 is an enlarged left side perspective view of a molten plastic delivery system shown schematically in FIG. 1.

FIG. 7 illustrates a manifold assembly 35 connected to the inlet end 148 of the manifold block 46. The manifold assembly includes a first cross-shaped or "clover leaf" shaped block manifold 74 which is connected to a second cross-shaped or "clover leaf" shaped block manifold 76 via four volumetric metering pumps 82, 84, 86, 88. Each metering pump acts to pump molten plastic through the manifold assembly 35, at a constant rate through the manifold block 46 to the nozzles 38a–38d. The first manifold 74 is flow-connected to a manifold connector 77 which receives an input stream of molten plastic through a central aperture 78. The molten plastic stream is divided and directed by the manifold 74 to the inlet of each of the pumps 82, 84, 86, 88 which deliver four streams of molten plastic into the second manifold 76 wherein the molten plastic is directed radially inwardly to each of four heated pipe sections 90, 92, 94, 96 which are in turn connected to the four molten plastic channels 102a–102d of the manifold block 46.

Figure 8:
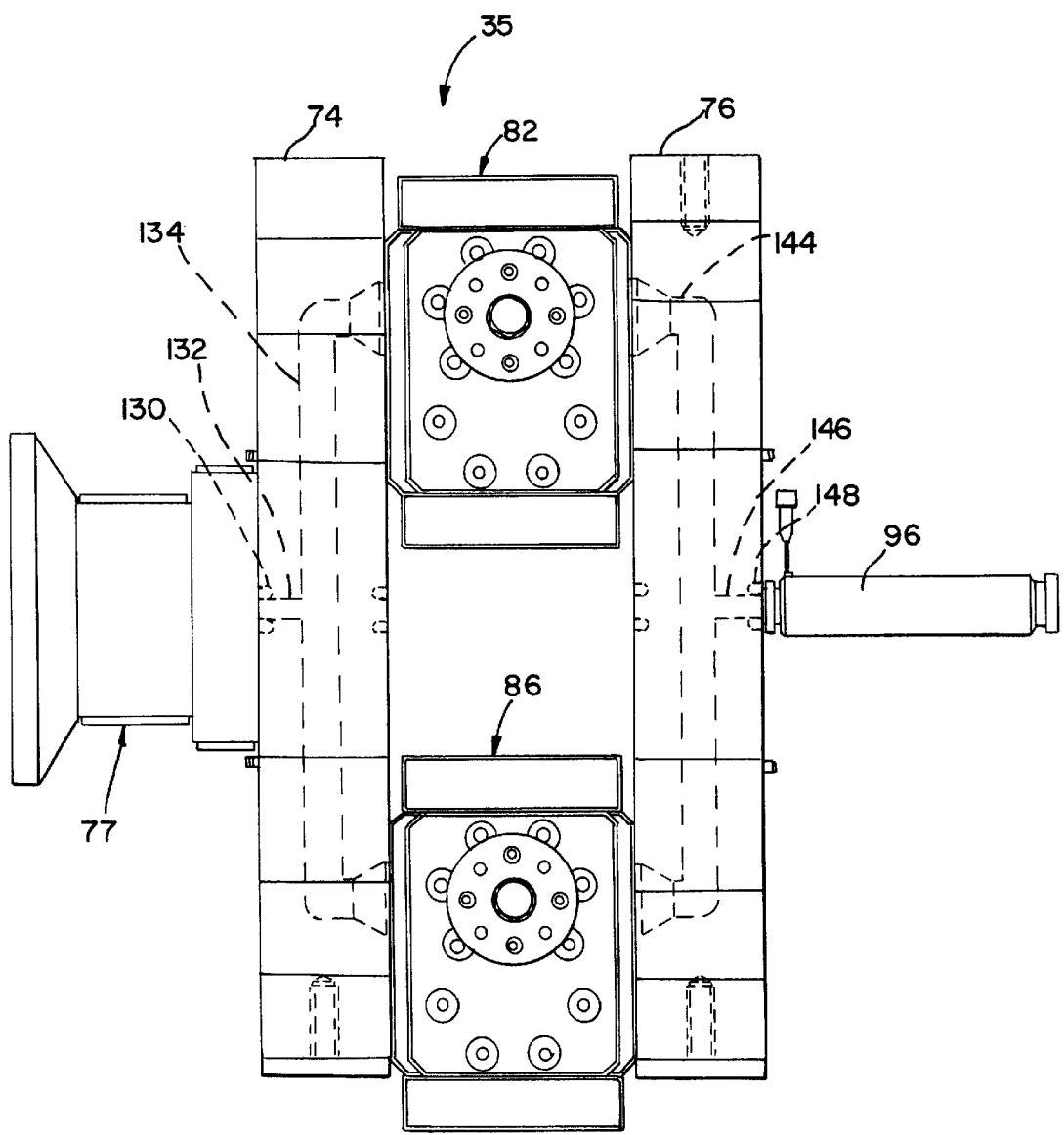
FIG. 8 is a rear elevational view of the molten plastic delivery system shown in FIG. 7.

FIG. 8 shows that the manifold connector 77 is sealed by an O-ring 130 to an internal channel 132 in the manifold 74 which is connected to one molten plastic delivery channel 134c of four molten plastic delivery channels 134a–134d, which is sealingly connected to the proportioning pump 82. An outlet of the pump 82 is connected to one radially directed channel 144c of four radially directed channels 144a–144d which is connected to one molten plastic outlet channel 146c of four molten plastic outlet channels 146a–146d which is sealingly connected by an O-ring 148 to the heated pipe section 96. Each of the pumps 82, 84, 86, 88 is connected similarly, forming four discrete flow paths from the inlet of the first manifold 74 to the four heated pipe sections 90, 92, 94, 96 which are connected to the L-shaped manifold block 46.

Figure 9:
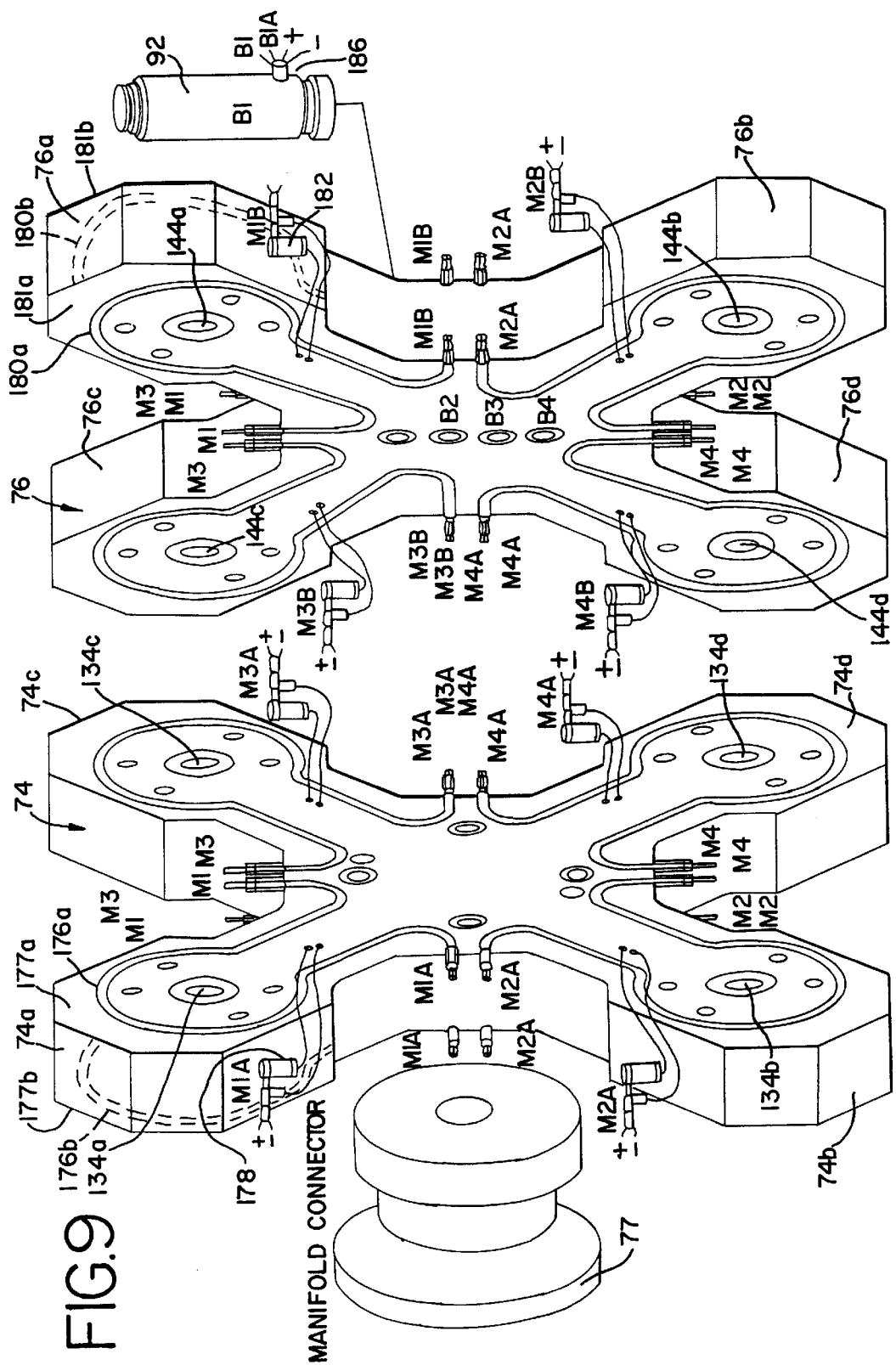
FIG. 9 is an exploded perspective view of a portion of the plastic delivery system shown in FIG. 7.

As illustrated in FIG. 9, the first manifold 74 includes four arms 74a–74d. Each of the arms includes heating wires arranged on opposite faces of the manifold to maintain the plastic in a preselected molten state within the manifold. For example, the arm 74a includes a heating wire loop 175a on the first face 177a, and an identical wire loop 175b on the second, opposite face 177b. Each of the arms include thermocouple sensor. For example, the arm 74a includes the thermocouple sensor 178.

The second manifold 76 includes four arms 76a–76d. Each of the arms includes heating wires arranged on opposite faces of the manifold to maintain the plastic in a molten state within the manifold. For example, the arm 76a includes a heating wire loop 180a on the first face 181 a, and an identical wire loop 180b on the second, opposite face 181b. Each of the arms include thermocouple sensor. For example, the arm 76a includes the thermocouple sensor 182.

The second, outlet manifold 76 is connected to the four heated pipes 90,92,94,96. Each of the pipes is heated by a separate heating element 186.

The pumps 82, 84, 86, 88, each heater wire and thermocouple of the manifolds 74, 76, the heater wires for the heated pipes, the heating elements in the manifold block 46, and the temperature probes in the manifold block are connected to a monitoring and control system which maintains the molten plastic flowing from the four heated pipes 90, 92, 94, 96 and the four nozzles 38a–38d with a preselected, equal temperature, pressure and flow rate.

FIGS. 10 through 12 illustrates an improved thermocouple assembly 200 advantageously incorporated into the apparatus of the present invention. The assembly is illustrated as installed into a nozzle block 300.

Although a nozzle block 300 is shown, the assembly 200 can be installed at any position in the assembly shown in FIGS. 1 through 9 where a molten plastic temperature reading or signal is desired. For example, the assembly 200 can be installed into one of the temperature ports 104a–104d and/or one of the temperature ports 106a–106d of the manifold block 46. The assembly includes a thermocouple element 202 which is inserted into a housing 210. The housing includes a tool engageable head 214 and a depending skirt 216. The skirt 216 holds a stack of seal elements 220 which form a packing 218. The skirt 216 has external threads 224 which engage internal threads 324 of a bore 326 of the nozzle block 300, or other structure from which an accurate molten plastic temperature is required. The element 202 can be connected to local temperature gauge or can provide a signal to a centralized control.

The probe 202 is slid into the housing 210 to a desired depth of the probe end into a molten plastic delivery channel 330. The housing 210 is threadedly driven into the bore 326 of the nozzle block 300 by tool driven rotation of the head 214. The packing 218 is compressed against a bottom 334 of the bore 326 and a bottom 216 of the head 214. The packing is also compressed radially against the probe 202 to seal thereto.

The inventive assembly of FIGS. 10–12 provides an easily adjustable and sealable temperature probe for use in molten plastic channels, especially in a compression molding apparatus.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus for delivering plastic pellet portions of molten plastic from a supply of extruded molten plastic, comprising:

a plurality of molten plastic delivery nozzles each having a pathway for delivering molten plastic to an open outlet end thereof;

a plurality of cutting blades mounted for rotation about an axis, said cutting blades extending radially from the axis, said cutting blades arranged to rotate in a path to be in close proximity to said open ends of said nozzles to cut a plurality of plastic pellets from said nozzles during rotation thereof; and a plurality of mold cavities arranged beneath said axis, said plurality of mold cavities being arranged in a plurality of rows, said rows being movable successively to a position below said cutter in parallel relationship to said axis, each said rows having a number of mold cavities which correspond to the number of said cutter blades.

2. The apparatus according to claim 1, further comprising a second plurality of cutting blades located at 180° from said first plurality about said axis.

3. The apparatus according to claim 1, wherein said cutting blades are mounted for rotation on a shaft, said shaft having air channels therein, at least one air channel extending to each of said cutting blades, said air channels arranged for applying air adjacent each of said cutting blades, to remove pellets from said cutting blades.

4. The apparatus according to claim 1, further comprising an inlet manifold block for delivering molten plastic to each of said nozzles.

5. The apparatus according to claim 1, comprising:

a shaft elongated along said axis wherein said cutter blades are mounted on said shaft;

a driven pulley connected to said shaft;

a motor; and a belt drive connecting a rotational output of said motor to said driven pulley.

6. The apparatus according to claim 1, wherein said cutter blades are mounted for rotation on a shaft, said shaft having air channels therein, at least one air channel extending to each of said cutters, said air channels arranged for applying air pressure at each of said cutter blades, said cutter blades having an air directing element acting to remove plastic pellets from said cutter blades;

a driven pulley connected to said shaft;

a motor; and a belt drive connecting a rotational output of said motor to said driven pulley.

7. The apparatus according to claim 1, further comprising a carousel, and a plurality of molding blocks, wherein said molding blocks are carried on said carousel around a circumference of said carousel, each molding block extended in a radial direction of said carousel, each molding block having a row of cavities substantially along said radial direction, and said cavities of each molding block arranged to receive pellets from said cutting blades, said carousel arranged to rotate beneath said cutter blades.

8. A compression molding apparatus, comprising:

a plurality of molten plastic delivery nozzles each having a pathway for delivering molten plastic to an open outlet end thereof;

a plurality of cutting blades mounted for rotation about an axis, said cutting blades extending radially from the axis, said cutting blades arranged to rotate in a path to be in close proximity to said open ends of said nozzles to cut a plurality of plastic pellets from said nozzles during rotation thereof; and a plurality of mold cavities arranged beneath said axis, said plurality of mold cavities arranged in rows, said rows being movable successively to a position below said cutter blades and in parallel relationship to said axis, each of said rows having a number of mold cavities which corresponds to the number of cutter blades;

wherein said cutting blades are mounted for rotation on a shaft, said shaft having air channels therein, at least one air channel extending to each of said cutting blades, said air channels arranged for applying air adjacent each of said cutting blades, to remove pellets from said cutting blades.

9. The apparatus according to claim 8, further comprising a second plurality of cutting blades located at 180° from said first plurality about said axis.

10. The apparatus according to claim 8, further comprising a carousel, and a plurality of molding blocks, wherein said molding blocks are carried on said carousel around a circumference of said carousel, each molding block extended in a radial direction of said carousel, each molding block having a row of cavities substantially along said radial direction, and said cavities of each molding block arranged to receive pellets from said cutting blades, said carousel arranged to rotate beneath said cutter blades.

11. A compression molding apparatus, comprising:

a plurality of molten plastic delivery nozzles each having a pathway for delivering molten plastic to an open outlet end thereof;

a manifold assembly having an molten plastic inlet, a plurality of molten plastic flow paths each having a molten plastic outlet, each molten plastic outlet respectively flow connected to one of said plurality of delivery nozzles, said assembly having a plurality of metering pumps for proportioning molten plastic flow through said flow paths; and at least one temperature probe and at least one heating element associated with each plastic flow path.

12. A compression molding apparatus, comprising:

a plurality of molten plastic delivery nozzles each having a pathway for delivering molten plastic to an open outlet end thereof;

a manifold assembly having an molten plastic inlet, a plurality of molten plastic flow paths each having a molten plastic outlet, each molten plastic outlet respectively flow connected to one of said plurality of delivery nozzles, said assembly having a plurality of heating elements, at least one heating element associated with each flow path, a plurality of temperature probes, at least one temperature probe associated with each flow path, and a controller, said controller signal-connected to said plurality of temperature probes and heating elements to ascertain the temperature of the molten plastic within each flow path and to correspondingly adjust the output of each heating element to maintain a consistent molten plastic temperature within said flow paths.

13. The apparatus according to claim 12 wherein said manifold assembly includes a plurality of metering pumps each arranged to pump molten plastic through one of said flow paths respectively, said metering pumps signal-connected to said controller, said controller adjusts the speed of said metering pumps for proportioning molten plastic flow through said flow paths.

14. The apparatus according to claim 13, comprising:

a first manifold having a central molten plastic receiving inlet and a plurality of molten plastic delivery channels extending radially through said first manifold and having first manifold outlets at ends of said channels;

said pumps each having a pump inlet respectively connected to one of said first manifold outlets, and a pump outlet for delivering molten plastic; and a second manifold having second manifold inlets, each second manifold inlet respectively connected to each of said pump outlets and having a plurality of radially directed channels therein, said radially directed channels each flow connected to one of said second manifold inlets and extending respectively to one of said molten plastic outlets, said molten plastic outlets arranged in a central array.

15. The apparatus according to claim 14, wherein said first and second manifolds are cross-shaped blocks, having arms of said cross shape in opposition, and said pumps are carried between opposing arms of said first and second manifolds.

16. An apparatus for delivering plastic pellet portions of molten plastic from a supply of extruded molten plastic, comprising:

a plurality of molten plastic delivery nozzles each having a pathway for delivering molten plastic to an open outlet end thereof;

a plurality of cutting blades mounted for rotation about an axis, said cutting blades extending radially from the axis, said cutting blades arranged to rotate in a path to be in close proximity to said open ends of said nozzles to cut a plurality of plastic pellets from said nozzles during rotation thereof;

an inlet manifold block for delivering molten plastic to each of said nozzles;

a first manifold having a central molten plastic receiving inlet and a plurality of molten plastic delivery channels extending radially through said first manifold and having first manifold outlets at ends of said channels;

a plurality of molten plastic pumps each having a pump inlet respectively connected to one of said first manifold outlets, and a pump outlet for delivering molten plastic; and a second manifold having second manifold inlets each respectively connected to each of said pump outlets and having a plurality of radially inwardly directed channels therein extending respectively to a central array of manifold outlets, said outlets in flow communication with said inlet manifold block.

17. A compression molding apparatus, comprising:

a plurality of molten plastic delivery nozzles each having a pathway for delivering molten plastic to an open outlet end thereof;

a manifold assembly having an molten plastic inlet, a plurality of molten plastic flow paths each having a molten plastic outlet, each molten plastic outlet respectively flow connected to one of said plurality of delivery nozzles, said assembly having a plurality of metering pumps for proportioning molten plastic flow through said flow paths said manifold assembly comprising a first manifold having a central molten plastic receiving inlet and a plurality of molten plastic delivery channels extending radially through said first manifold and having first manifold outlets at ends of said channels, said pumps each having a pump inlet respectively connected to one of said first manifold outlets, and a pump outlet for delivering molten plastic; and a second manifold having second manifold inlets, each second manifold inlet respectively connected to each of said pump outlets and having a plurality of radially directed channels therein, said radially directed channels each flow connected to one of said second manifold inlets and extending respectively to one of said molten plastic outlets, said molten plastic outlets arranged in a central array.

18. The apparatus according to claim 16 wherein said first and second manifolds are heated to maintain said molten plastic at a preselected temperature.

19. The apparatus according to claim 17, wherein said first and second manifolds are heated to maintain said molten plastic at a preselected temperature.

20. The apparatus according to claim 17, wherein said first and second manifolds are cross-shaped blocks, having arms of said cross shape in opposition, and said pumps carried between opposing arms of said first and second manifolds.

* * * * *